US006744423B2

(12) United States Patent
Kraft et al.

(10) Patent No.: US 6,744,423 B2
(45) Date of Patent: Jun. 1, 2004

(54) COMMUNICATION TERMINAL HAVING A PREDICTIVE CHARACTER EDITOR APPLICATION

(75) Inventors: Christian Kraft, Hvidovre (DK); Jonathan Sharp, Sunningdale Berks (GB)

(73) Assignee: Nokia Corporation, Espoo (FI)

( * ) Notice: Subject to any disclaimer, the term of this patent is extended or adjusted under 35 U.S.C. 154(b) by 236 days.

(21) Appl. No.: 09/988,196

(22) Filed: Nov. 19, 2001

(65) Prior Publication Data

US 2003/0095102 A1 May 22, 2003

(51) Int. Cl.[7] .................................................. G09G 5/00
(52) U.S. Cl. ...................... 345/169; 345/172; 345/857; 379/368
(58) Field of Search ................................ 345/156–169, 345/816, 857, 172; 341/21, 22, 23; 379/368, 433.06, 433.07, 433.04

(56) References Cited

U.S. PATENT DOCUMENTS 5,797,098 A 8/1998 Schroeder et al. .......... 455/464
5,818,437 A 10/1998 Grover ....................... 345/326
6,483,913 B1 * 11/2002 Smith ......................... 379/368
6,556,841 B2 * 4/2003 Yu .............................. 455/556

FOREIGN PATENT DOCUMENTS

| EP | 1136905 | 9/2001 |
| GB | 2355142 | 4/2001 |
| WO | 98/33111 | 7/1998 |

* cited by examiner

*Primary Examiner*—Lun-Yi Lao
(74) *Attorney, Agent, or Firm*—Antonelli, Terry, Stout & Kraus, LLP

(57) ABSTRACT

A user interface for a text entry device, comprising: a display having a first display section and a second display section, and a keypad including a set of text entry keys each having a set of characters associated therewith. The set of characters associated with each of the text entry keys being displayed in the second display section. A predictive character editor engine with associated directories is adapted to receive a string of input strokes and to output a list of matching word candidates in response thereto. A controller receives inputs from a set of text entry keys, and generates said string of input strokes for the predictive character editor. The controller presents in said first display section at least one of said matching word candidates from the predictive character editor for selection by the user.

20 Claims, 5 Drawing Sheets

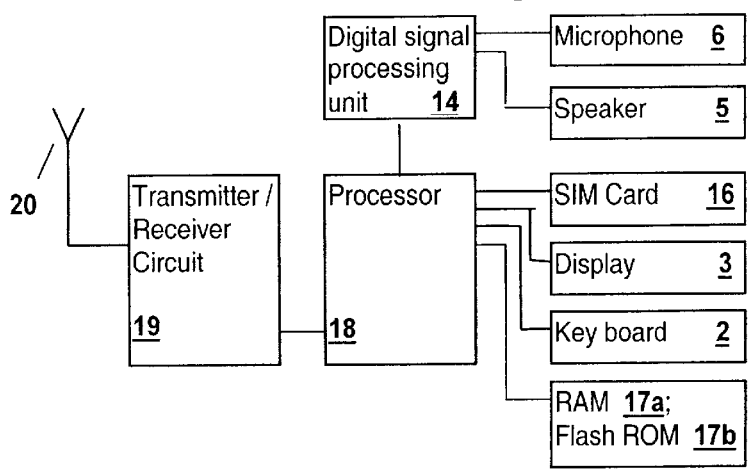
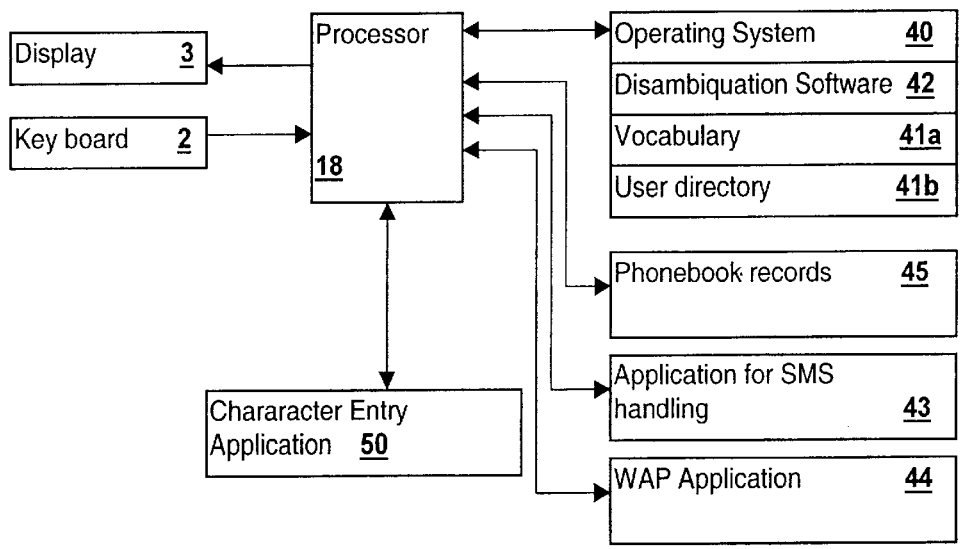
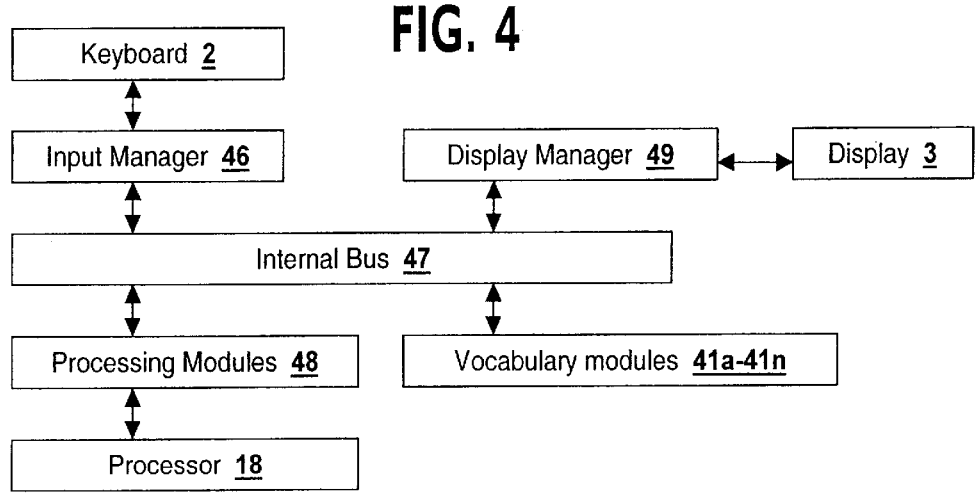

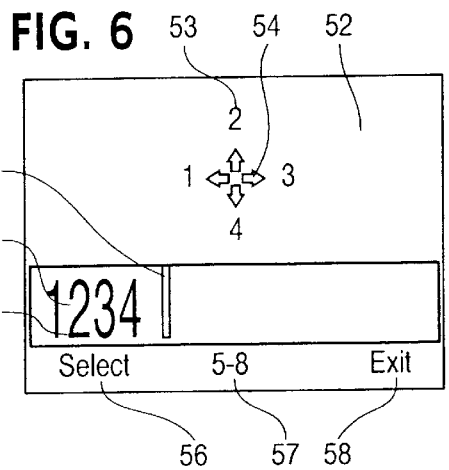
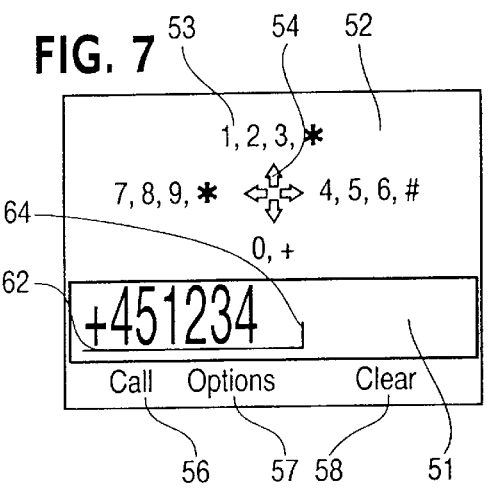
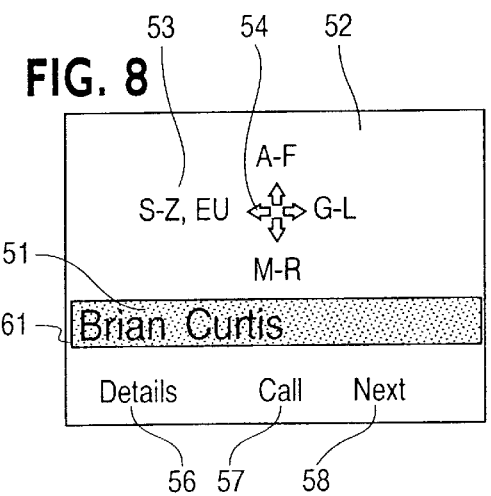
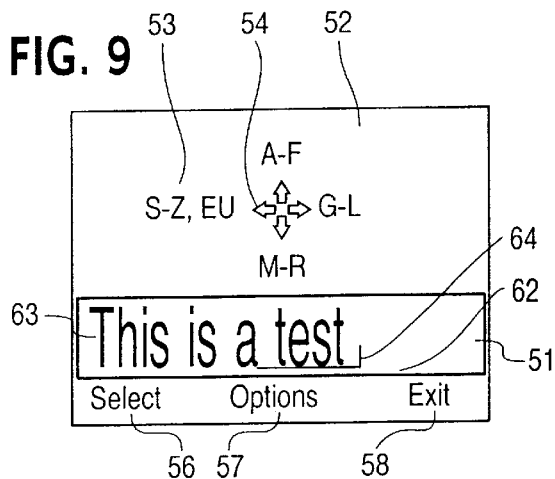

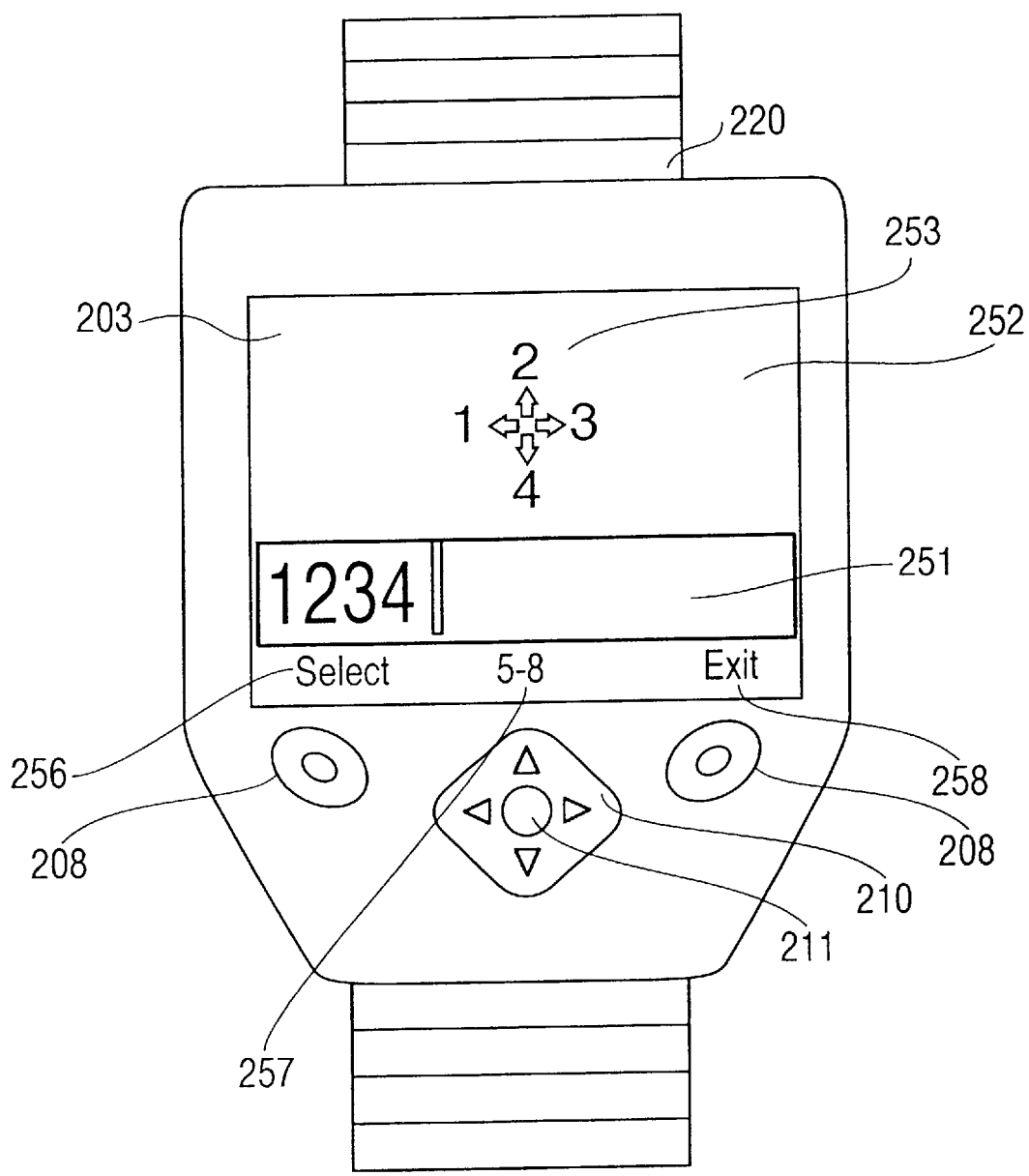

COMMUNICATION TERMINAL HAVING A PREDICTIVE CHARACTER EDITOR APPLICATION

BACKGROUND OF THE INVENTION

The invention relates to a communication terminal, e.g. a cellular or cordless phone or a communicator, having a predictive text editor application for entering and editing data.

A cellular phone launched by the applicant—Nokia 3210™—a predictive character editor receives input strings from the keypad. U.S. Pat. No. 5,818,437 and WO 98/33111 describes predictive character editors. In order to minimise the size of the phones, it is necessary to reduce the number of keys.

SUMMARY OF THE INVENTION

According to a first aspect of the invention there is provided a user interface for a text entry device, comprising: a display having a first display section and a second display section; a keypad including a set of text entry keys each having a set of characters associated therewith; said set of characters associated with each of text entry keys being displayed in the second display section; predictive editor engine with associated directories and adapted to receive a string of input strokes and to output a list of matching word candidates in response thereto; a controller receiving inputs from set of text entry keys, and to generate said string of input strokes for the predictive editor, and the controller presents in said first display section at least one of said matching word candidates from the predictive character editor for selection by the user.

According to the preferred embodiment of the invention, a four way navigation key is used for entering letters. Few keys (e.g. 4 keys) are each associated with a plurality of letters (e.g. 6–8 letters). When searching records in a database (e.g. the phonebook) the user will have to press these few keys. Then the phone compares the ambiguous key stroke string with the content of the searched database the editor identifies the words fitting with the ambiguous key stroke string and displays one of the matching records. Hereby the user will only have to press a few keystrokes in order to unambiguously identify a searched record.

According to a second aspect of the invention there is provided a communication terminal having such a user interface.

According to a further aspect of the invention there is provided a method of handling a user interface for a communication terminal, and comprising steps of: displaying in the second display section of the display sets of characters associated with each of the text entry keys; pressing at least one of a set of text entry keys each having a set of characters associated therewith; generating a presentation of the string of input strokes and forwarding this presentation to a predictive editor engine with associated directories; said predictive character editor engine outputs a list of matching word candidates in response to a received presentation; and presenting in a first display section of the display at least one of said matching word candidates from the predictive editor for selection by the user.

BRIEF DESCRIPTION OF THE DRAWING

For a better understanding of the present invention and to understand how the same may be brought into effect reference will now be made, by way of example only, to accompanying drawings, in which:

FIG. 2 schematically shows the essential parts of a telephone for communication with e.g. a cellular network.

FIG. 3 shows the major components of the predictive text editor according to a preferred embodiment of the invention.

FIG. 4 shows the architecture of the ambiguity eliminating software according to a preferred embodiment of the invention.

FIG. 6 shows a display for entering numbers by means of un-ambiguous keystrokes into the text string in a communication terminal according to the invention.

FIG. 7 shows a display for entering numbers by means of ambiguous keystrokes into the text string in a preferred embodiment of a communication terminal according to the invention.

FIG. 8 shows a display for phonebook search by means of ambiguous keystrokes in a preferred embodiment of a communication terminal according to the invention.

FIG. 9 shows a display for entering characters by means of ambiguous keystrokes into the text string in a preferred embodiment of a communication terminal according to the invention.

FIG. 10 shows a second embodiment of a communication terminal according to the invention.

DETAILED DESCRIPTION OF THE INVENTION

Figure 1:
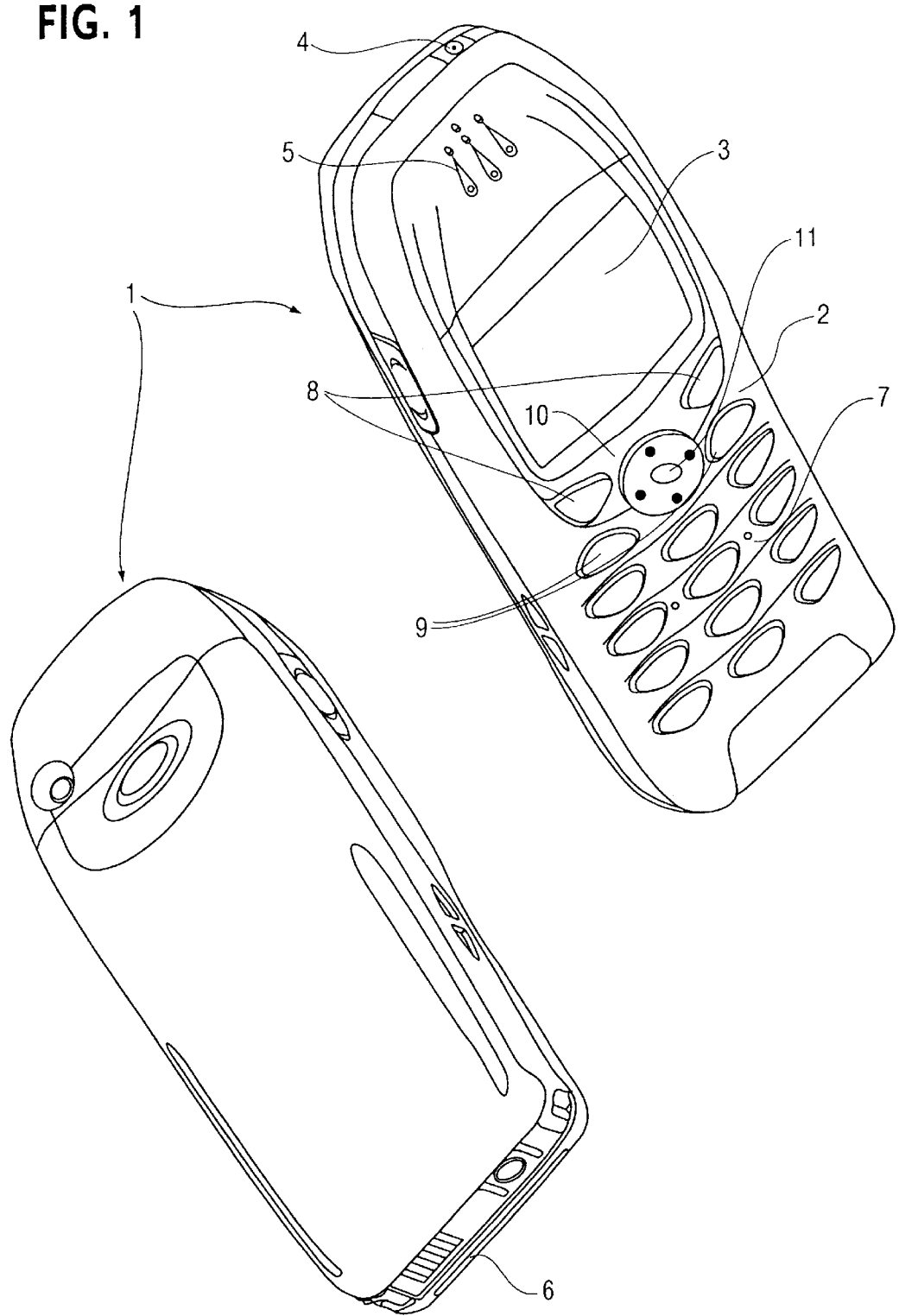
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5 (only openings are shown), and a microphone 6 (only openings are shown). The phone 1 according to the preferred embodiment is adapted for communication preferable via a cellular network e.g. a GSM network. However the invention could be implemented into any type of device having an editor and ambiguous text entry keys. These kinds of devices could be organisers of pocket size, pagers, and hi-fi equipment needing user text input.

According to the preferred embodiment the keypad 2 has a first group 7 of keys as alphanumeric keys, two soft keys 8, and a four-way navigation key 10. A separate selection key 11 may be used for selecting a highlighted item. However the separate selection key may be integrated in the four-way navigation key 10 and activated, when at least two directions are selected by pressing the four-way navigation key 11. Furthermore the keypad preferably includes two call-handling keys 9 for initiating and terminating calls. The present functionality of the soft keys 8 is shown in a separate field in the bottom of the display 3 just above the keys 8. This key layout is characteristic of e.g. the Nokia 6210™ phone.

FIG. 2 schematically shows the most important parts of a preferred embodiment of the phone, said parts being essential to the understanding of the invention. A processor 18, which supports the GSM terminal software, also controls the communication with the network via the transmitter/receiver circuit 19 and an antenna 20.

The microphone 6 transforms the user's speech into analogue signals; the signals formed thereby are A/D converted in an AND converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Basic Operation of the Predictive Text Editor.

FIG. 3 shows the major components of the predictive text editor according to the invention. The display 3 and the keyboard 2 establish the man-machine interface. The processor 18 executes instructions and reads data from and writes data in the memory 17b. Software instructions in the memory 17b include an operating system 40, a disambiguation program 42 and its standard vocabulary 41a and a user defined vocabulary 41b (e.g. copied from the phonebook 45. When user input is needed in application programs, such as an SMS message handling application 43, a WAP browser application 44, and for searching in phonebook records 45, the processor 18 opens a character entry application 50 in which the user may enter characters and use the entered character strings in the application from which the character entry application 50 is opened.

System Architecture

FIG. 4 shows the architecture of the disambiguating software or the predictive text editor engine. Input from a keypad 2 is processed in an input manager 46, and passed via internal bus means 47 to a processing module 48, which keeps a record of the current key sequence until the user has accepted a word based on this sequence by pressing the space key, e.g. being present by short pressing (shorter than e.g. 0.8 sec) the "0" key of alphanumeric keys. When a key stroke has been received by the processing module 48, the current key sequence is communicated via internal bus means 47 to a processor (preferably being the same processor as the processor 18), which forwards the sequence to one or more modules 41 acting as electronic vocabularies.

The vocabulary modules 41a and 41b, and further vocabulary modules if needed, work in parallel and respond individually if they contain data matching the current keystroke sequence. One vocabulary module 41a might include a dictionary containing words in a language, e.g. English, defined by the user and used as editing language. The vocabulary modules 41a and 41b often supply a plurality of matching words—either being displayed or available through a selection list.

The processor 18 accumulates a complete list of matching words in the processing module 48, and transfers the selection list to a display manager 49 and the display 3 via the internal bus means 47.

In the most cases, the disambiguation software will work as an editor server and therefore pass data strings directly to another client or application program 43, 44 running on the processor 18, too. In this case the keypad 2, the input processor 46 and the display manager 49 will be integrated in the application program 43, 44 using the predictive text editor as a server. Target applications programs for the character entry application 50 used in a handset includes the electronic phone book memory, notepad, messages, calendar, and Internet browsing.

According to the referred embodiment of the invention the four way navigation key 10 may activate four not shown micro-switches in a per se known manner. When the navigation key 10 is pressed adjacent to the periphery one of the not shown micro-switches is depressed and the processor 18 interprets this single micro-switch depressions as instruction to move a cursor up, down or to the left or right side in e.g. the menu. When two or more switches is depressed the processor 18 interprets this multi-micro-switch depressions as selection of a high lighted item or selection of a soft key operation dedicated to the navigation key in this mode.

Figure 5:
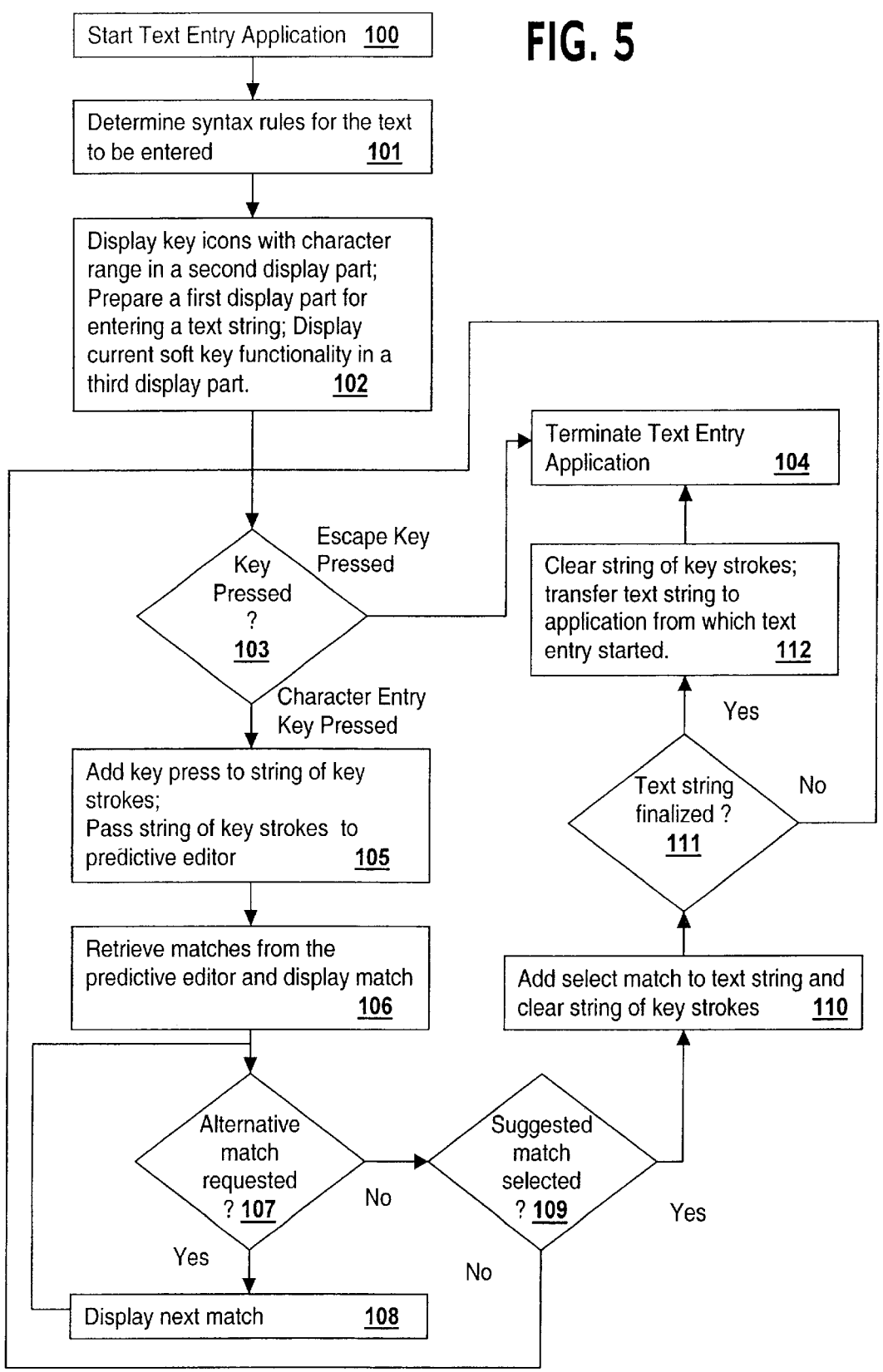
FIG. 5 shows a flow chart illustrating the steps performed in a preferred embodiment according to the invention.

The preferred way of carrying out the invention will be discussed with reference to FIG. 5. When the user is using the phone or the terminal and he in a menu point requests or is requested to input a character string, a number, or a name, the processor 18 starts the character entry application 50 in step 100. First the character entry application 50 starts analysis of the context of the input to be entered in order to set up syntax rules for the input at step 101. When this is done, character entry application 50 in step 102 displays key icons 54 with character range 53 in a second display part 52, and prepares a first display part 51 for entering the input. The current soft key functionality is displayed in soft-key label display parts 56–58.

Then the character entry application 50 waits for key pressed in step 103 with one of the display layouts illustrated in FIGS. 7–9. If the user wants to exit the character entry application 50, and presses an escape key, the character entry application 50 terminates in step 104 to the menu point from which the character entry application 50 was initiated.

When a character entry key has been pressed in step 103, the character entry application 50 add the key press to a string of key stokes, and forwards this string of key strokes to the predictive editor engine 40, 42 in step 104. The predictive editor engine 40, 42 processes the string of key stokes in step 106, and replies with the matching candidates to the character entry application 50. The character entry application 50 then displays at least one of the matching candidates in the first display section 51, either alone or in a word string where the entered word is intended to be used. The other matches are available by pressing either one of the soft keys or another predefined key—e.g. a "*"-key. If an alternative matching candidate is requested in step 107, the character entry application 50 replaces the originally displayed matching candidate with the next candidate in the loop in step 108.

If neither an alternative match is requested nor the suggested matching candidate is selected in step 107 and 109, respectively, the character entry application 50 goes back to step 103 waiting for the next character entry key press.

When the user in step 109 selects the suggested matching candidate for use, the character entry application 50 adds the selected match to a text string, and clears the string of keystrokes in step 110. The text string to which the suggested matching candidate is added may comprise the suggested matching candidate alone, a word string including the suggested matching candidate and previously suggested matching candidates, a word string including the suggested matching candidate and at least one pre-canned word.

If the user at step 111 indicates that the character entry has been finalised, the character entry application 50 in step 112 clears the string of key strokes, and transfers the entered word string to the application from which the character entry application 50 started, and terminates in step 104.

If the text string is deemed not to be finalised in step 111, the character entry application 50 goes back to step 103 for further input.

Dialing Numbers Already in Phone Book

Typing numbers by means of the method according to the invention, see FIG. 7, may also be done by using the editor in the same basic way as when finding a name in the phone book. The idea is that all the phone numbers in the phone book will be used as the "dictionary" for the predictive editor, such as the engine known as T9®. To type e.g. the number "+451234" (assuming that this number is in the phone book), the user needs to do only seven key-presses with reference to FIG. 7 the user has to press "down", "right", "right", "up", "up", "up", and "right".

One of the current matches is shown underlined 62 in the first display section 51, and a bar 64 shows where the next character will be inserted. The present functionality of the selection key, "Options", is displayed in the special selection key section 57 of the display while the two soft-key sections 56, 58 indicates that the two soft-key 8 has the function "Call", and "Clear" deleting the character left to the bar 64.

The phone can preferably—when only one possible match is left—automatically fill in the last part of the number (so the user does not have to type in all digits of a number). Depending on the structure of phone numbers (how similar they are in a predictive editor engine—e.g. the T9® language) and when doing "auto-ending of numbers" when only one match occurs, it is estimated that this method in average requires less than one key-press per digit.

Searching in Phone Book.

According to the invention and with reference to FIG. 8, the user can use a predictive editor for finding a name stored in the phonebook 45 with all the names (first and last names) in the phone book used as dictionary for the predictive editor. Only five key-presses (or less) may do finding e.g. all people starting with "Brian".

Current matches are shown in a first display section 51, and the highlighted name 61 in the first display section 51 can be called right away by pressing the selection key 11 having the functionality "call" displayed in the special selection key section 57 while the two soft-key sections 56, 58 indicates that the two soft-key 8 has the function "Details" showing all data stored in the selected phonebook record, and "Next" scrolling to the matching record. The records are shown in an endless loop.

Tests have shown that this search method with a phone book of e.g. 100–200 names will on average mean less than four key-presses to find a name for calling.

Typing Text Using a Predictive Editor

Typing text by means of the method according to the invention may also be done by using a predictive editor in the same basic way as when finding a name in the phone book. The user can e.g. type the word "test" as shown in FIG. 9 simply by pressing the arrows keys "Left", "Up", "Left", and "Left". Compared with the standard use of a predictive editor, such as T9®, this "reduced keypad" will still work perfectly, but will sometimes mean more word matches for a specific key combination.

One of the current matches is shown underlined 62 in the first display section 51, and a bar 64 shows where the matching word is inserted in a word string 63. The present functionality of the selection key, "Options", is displayed in the special selection key section 57 of the display while the two soft-key sections 56, 58 indicates that the two soft-key 8 has the function "Select" giving access to operations on the text, and "Back" stepping back in the menu.

Simple Number Dialing

An alternative to the predictive editor is a manual number-typing concept according to which "pages" with numbers unambiguously related to each text entry key could be used. The user can here directly insert a digit by pressing the corresponding navigation key 10. The selection key 11 will give next page (5–8), with wrapping. If signs as "*", "#", and "+" are included, this system will require 4 pages. The average number of key-presses needed using this method (for digits only, and when we re-start at first page each time) is (4*1+4*2+2*3)/10=1,8 key-presses. Using also other keys (e.g. power-key etc) can mean even fewer key-presses (1,5)

With reference to FIG. 6, the display 3 comprises a first display section 51 matching word candidates are presented for selection by the user, and a second display section 52 in which sets of characters 53 associated with each of text entry keys 10 being displayed in the second display section together with icons 54 identifying said text entry keys 10. The text entry keys 10 will in the text entry mode have the functions indicated in the second display section 52, and otherwise preferably have functions for moving a cursor or highlighting selectable items while the selection key 11 is used for selecting the highlighted item.

By showing the present character range or characters associated with each of the text entry keys the processor may change the range of characters letter by letter in dependence with the probability of the next letter in dependence of the preceding letter.

The predictive editor engine 40, 42 with associated directories or vocabularies 41a, 41b and 45 is adapted to receive a string of input strokes from the processor 18 and to output a list of matching word candidates in response thereto. One or more of these matching word candidates is shown by the processor 18 in the first display section 51 for selection by the user.

The first display section 51 includes preferably a text string 60 and blinking bar 59 indicating where the added text will be positioned. The function of the two soft-keys is displayed in special soft-key sections 56 and 58, and the function of the selection key 11 is displayed in a special selection key section 57 between the two soft-key section 56, 58. The selection key 11 will usually have the function "select", but the function may differ as here to 5–8, which will change the character range of the text entry keys 10 to 5, 6, 7 and 8 respectively. Hereby the selection key 11 will act as a third soft key.

According to the invention it has become is possible to enter a string of characters into a terminal by means of an un-ambiguous set of text entry keys 10 without using a set of alphanumeric keys 2 having fixed character ranges written thereon. The invention makes it possible to implement a text editor into very small devices having a very limited amount of control and entry keys, such as the wrist watch type terminal shown as FIG. 10. This terminal has a wrist watch strap 220, a terminal box 221 with a not shown Bluetooth™—link to a not shown audio headset. The terminal has a display 203 and two soft-keys 208, a four-way navigation key 210 with a select key 211. The display 203 comprises a first display section 251 where matching word candidates are presented for selection by the user, and a second display section 252 in which sets of characters 253 associated with each of text entry keys 210 (the four-way navigation key) being displayed in the second display section together with icons 254 identifying said text entry keys 210.

What is claimed is:

1. A user interface for a text entry device, comprising:
a display having a first display section and a second display section;
four navigation keys each having a first set of characters associated therewith, each said navigation key for moving a cursor means in the display in a text entry mode;
said first set of characters associated with each navigation key being displayed in the second display section;
a predictive character editor engine with associated directories and adapted to receive a string of input strokes and to output a list of matching word candidates in response thereto;

a controller receiving inputs from set of text entry keys, and to generate said string of input strokes for the predictive editor, and the controller presents in said first display section at least one of said matching word candidates from the predictive editor for selection by the user, wherein each said four navigation keys may be reconfigured by the user to be associated with a second set characters using a soft key on a pointing device of the text entry device, each second set of characters being less in number than the first set of characters associated with each said four navigation keys, the second set of characters being displayed in the second display section after the reconfiguration.

2. A user interface according to claim 1, wherein character ranges for the four navigation keys are displayed together with icons for the associated four navigation keys in the second display section.

3. A user interface according to claim 2, wherein the pointing device comprises a joystick.

4. A communication terminal having a user interface comprising:

a display having a first display section and a second display section;

four navigation keys each having a first set of characters associated therewith, each said navigation key for moving a cursor means in the display in a text entry mode;

said first set of characters associated with each navigation key being displayed in the second display section;

a predictive character editor engine associated with associated directories and adapted to receive a string of input strokes and to output a list of matching word candidates in response thereto;

a controller receiving inputs from said navigation keys, and generating said string of input strokes for the predictive character editor, and the controller presents in said first display section at least one of said matching word candidates from the predictive character editor engine for selection by the user, wherein each said four navigation keys may be reconfigured by the user to be associated with a second set characters using a soft key on a pointing device of the communication terminal, each second set of characters being less in number than the first set of characters associated with each said four navigation keys, the second set of characters being displayed in the second display section after the reconfiguration.

5. A communication terminal according to claim 1, wherein character ranges for said navigation keys are displayed together with icons for the associated navigation keys in the second display section.

6. A communication terminal according to claim 5, wherein the pointing device comprises a joystick.

7. A method of handling a user interface for a communication terminal, and comprising steps of:

displaying in a second display section of a display first sets of characters associated with each of four navigation keys;

pressing at least one of said four navigation keys to select the first set of characters associated therewith;

generating a presentation of the string of input strokes and forwarding this presentation to a predictive editor engine with associated directories; said predictive editor engine outputs a list of matching word candidates in response to a received presentation; and presenting in a first display section of the display at least one of said matching word candidates from the predictive character editor engine for selection by the user, wherein each said four navigation keys may be reconfigured by the user to be associated with a second set characters using a soft key on a pointing device of the communication terminal, each second set of characters being less in number than the first set of characters associated with each said four navigation keys, the second set of characters being displayed in the second display section after the reconfiguration.

8. A method according to claim 7, wherein character ranges for the four navigation keys are displayed together with icons for the associated four navigation keys in the second display section.

9. A method according to claim 8, wherein the pointing device comprises a joystick.

10. A method for text prediction in a mobile device, comprising:

dividing a character array into four sub arrays, each sub array including a range of at least one of a character and a number;

displaying four key icons and an associated said range for each of the four sub arrays;

reconfiguring the sub arrays to produce further smaller sub arrays using a soft key on a pointing device, a range of the smaller sub arrays being less that the range of the sub arrays, the displayed associated range being changed to represent the reconfigured sub arrays;

selecting one of said range based on a desired at least one of a word and number by moving the pointing device in a direction of one of the displayed key icons and depressing one of at least two soft keys on the mobile device;

sending the selection to a text prediction function, the text prediction function keeping a record of each said selection; and predicting at least one of a word and number desired after each said selection based on the selection record.

11. The method according to claim 10, further comprising displaying a soft key functionality for the at least two soft keys in a soft key label display area of the display.

12. The method according to claim 10, further comprising displaying the predicted at least one of a word and number desired after each said selection.

13. The method according to claim 12, further comprising selecting the displayed predicted at least one of a word and number desired.

14. The method according to claim 10, further comprising reconfiguring the sub arrays to produce the further sub arrays by depressing the soft key on the pointing device.

15. The method according to claim 10, further comprising clearing the record of selections by depressing one of the at least two soft keys representing a termination.

16. The method according to claim 10, further comprising forming a text string from each predicted at least one of a word and number, each predicted at least one of a word and number being added to the text string if the predicted at least one of a word and number is selected.

17. The method according to claim 10, further comprising predicting a telephone number after each said selection based on the selection record.

18. The method according to claim 10, further comprising predicting a name of a person after each said selection based on the selection record.

19. The method according to claim 10, further comprising displaying the selected range in a first display area on a display of the mobile device.

20. The method according to claim 10, further comprising displaying the four key icons and the associated said range for each of the four sub arrays in a second display area on a display of the mobile device.

* * * * *